United States Patent
Brown

(10) Patent No.: US 8,924,924 B2
(45) Date of Patent: Dec. 30, 2014

(54) REPRESENTING THE STRUCTURE OF A DATA FORMAT USING A CLASS-BASED REPRESENTATION

(75) Inventor: Kevin Michael Mitchell Brown, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 911 days.

(21) Appl. No.: 12/749,268

(22) Filed: Mar. 29, 2010

(65) Prior Publication Data

US 2011/0239185 A1    Sep. 29, 2011

(51) Int. Cl.
G06F 9/44        (2006.01)
G06F 17/27       (2006.01)

(52) U.S. Cl.
CPC .................................. *G06F 17/2705* (2013.01)
USPC ............................. 717/105; 717/104; 717/143

(58) Field of Classification Search
None
See application file for complete search history.

(56) References Cited

U.S. PATENT DOCUMENTS

| | | | |
|---|---|---|---|
| 6,850,950 B1 | 2/2005 | Clarke et al. | |
| 7,188,332 B2 * | 3/2007 | Charisius et al. | 717/104 |
| 7,461,335 B2 * | 12/2008 | Yarde et al. | 715/234 |
| 7,519,706 B2 | 4/2009 | Motoyama et al. | |
| 7,600,215 B2 * | 10/2009 | Cherdron et al. | 717/105 |
| 7,644,414 B2 | 1/2010 | Smith | |
| 7,877,731 B2 * | 1/2011 | Bekelman | 717/123 |
| 7,904,892 B2 * | 3/2011 | Babb et al. | 717/144 |
| 7,987,445 B2 * | 7/2011 | Fuller et al. | 717/105 |
| 8,336,023 B2 * | 12/2012 | Kuzsma et al. | 717/105 |
| 8,386,998 B2 * | 2/2013 | Satoh et al. | 717/104 |
| 2003/0084424 A1 * | 5/2003 | Reddy et al. | 717/105 |
| 2004/0015858 A1 * | 1/2004 | Seto et al. | 717/120 |
| 2005/0234844 A1 | 10/2005 | Ivanov | |
| 2006/0212859 A1 * | 9/2006 | Parker et al. | 717/143 |
| 2007/0256051 A1 * | 11/2007 | Rojer | 717/104 |
| 2008/0040704 A1 * | 2/2008 | Khodabandehloo et al. | 717/105 |
| 2008/0091409 A1 | 4/2008 | Anderson | |
| 2008/0320404 A1 * | 12/2008 | Chen et al. | 715/763 |
| 2009/0125877 A1 * | 5/2009 | Kuzsma et al. | 717/105 |
| 2009/0222799 A1 * | 9/2009 | Stewart et al. | 717/143 |
| 2010/0058288 A1 * | 3/2010 | Zitzewitz et al. | 717/105 |
| 2010/0162204 A1 * | 6/2010 | Baumann et al. | 717/106 |

OTHER PUBLICATIONS

Conti, et al., "Visual Reverse Engineering of Binary and Data Files," VizSec 2008, LNCS 5210, pp. 1-17, downloaded from the internet on Jan. 15, 2013, <url>: http://link.springer.com/chapter/10.1007%2F978-3-540-85933-8_1?LI=true#page-1.*

(Continued)

*Primary Examiner* — Thuy Dao
*Assistant Examiner* — Stephen Berman
(74) *Attorney, Agent, or Firm* — Dan Choi; Judy Yee; Micky Minhas

(57) ABSTRACT

A method of operating a computing device to explore content of a data storage, such as a binary file, using a format definition. The format definition comprises a class, with data members of the class representing a layout of data elements and their relationships in a type of a data storage. The relationships among the data elements may be represented using inheritance. The class derives from a base class providing reflection functionality. The reflection allows parsing the class so that its data members and their values are accessed at runtime, using the base class. Results of the parsing are presented in a form that allows exploring the content of the data storage and modifying the parsing results. New data may be created that conforms to the modified results.

20 Claims, 6 Drawing Sheets

(56) References Cited

OTHER PUBLICATIONS

Hendrix et al., "An extensible framework for providing dynamic data structure visualizations in a lightweight IDE," 2004, SIGCSE '04, Proceedings of the 35th SIGCSE technical symposium on Computer science education, pp. 387-391.*

Conti et al., "Visual exploration of malicious network objects using semantic zoom, interactive encoding and dynamic queries," 2005, IEEE Workshop on Visualization for Computer Security, (VizSEC 05), pp. 83-90.*

Song et al., "BitBlaze: A New Approach to Computer Security via Binary Analysis," 2008, Proceedings of the 4th International Conference on Information Systems Security, pp. 1-25.*

Website: "Parsing Is Easy: Base C Sharp Classes and Expressions Calculator," available at: http://www.codeguru.com/csharp/csharp/cs_syntax/operators/article.php/c14995_2/, Jan. 2008. Downloaded Feb. 24, 2010.

Website: "A Simple SGML Parser and Visitor Pattern Loveliness," available at: http://www.codeproject.com/KB/recipes/ReflectVisitor.aspx , Jan. 11, 2009. Downloaded Feb. 24, 2010.

Saxon, "Object-Oriented Recursive Descent Parsing in C#," inroads—The SIGCSE Bulletin, vol. 35, No. 4, Dec. 2003.

Website: "How Much Work Should the Constructor for an HTML Parsing Class Do?" available at: http://stackoverflow.com/questions/1183531/how-much-work-should-the-constructor-for-an-html-parsing-class-do, Downloaded Feb. 24, 2010.

Website: "Linq to Stdf, Project Description," available at: http://linqtostdf.codeplex.com/, May 23, 2008. Downloaded Mar. 26, 2010.

Website: "Linq to Stdf, General Overview," available at: http://linqtostdf.codeplex.com/wikipage?title=Basic%20Idea&referringTitle=Home, May 23, 2008. Downloaded Mar. 26, 2010.

Website: "Linq to Stdf, Motivation," available at: http://linqtostdf.codeplex.com/wikipage?title=Motivation&referringTitle=Home, May 23, 2008.

Website: "Linq to Stdf, Example Usage," available at: http://linqtostdf.codeplex.com/wikipage?title=Example%20Usage&referringTitle=Home, May we, 2008. Downloaded Mar. 26, 2010.

* cited by examiner

REPRESENTING THE STRUCTURE OF A DATA FORMAT USING A CLASS-BASED REPRESENTATION

BACKGROUND

Today there exist many different formats for representing data in computing devices. Typically, in a computing device, data is stored in the form of computer files. A file format defines a particular way in which information is encoded for storage in a computer file. A computer file may have a certain structural organization of different types of data.

Different applications, such as those used in malware detection, software testing including detection of security vulnerabilities and others, may require describing a structure of a data format in a manner that allows manipulating and creating new data stored in this data format. Existing techniques for defining a structure of the data format employ Extensible Markup Language (XML) and textual representations of the structure. Such techniques may not be flexible enough to be used for defining complex structures or structures where elements are organized hierarchically. Further, C-like programming languages have been used to define a structure of the data format. However, while providing some improvements over the XML and textual representations, the methods that use the C-like programming languages may lack extensibility and a new description of the data format needs to be generated for each application.

SUMMARY

Existing techniques for defining a structural organization of data elements within a data storage may not provide sufficient flexibility and reusability. Performance of many applications may be improved if the structural organization is defined in a manner that would allow different applications to parse data storages having such or similar structural organization.

Accordingly, an improved technique for retrieving and exploring a structure of a data storage storing data in a certain data format is provided. The technique includes using a format definition that comprises a description of the structure of the data format using a data structure, such as a class, where members of the class may represent data elements of the data storage and a structural layout (e.g., relationships) of the data elements. A class may be implemented as known in object-oriented programming and may comprise data members and function members. The format definition may be comprise one or more classes. To represent relationships between the data elements, the inheritance concept, as known in object-oriented programming, may be used. Thus, if a data element is a specific type of another, more generic, data element, a class used to represent such data element may derive from the class used to represent the more generic data element.

A class that is used to represent content of a data storage may derive from a base class that provides reflection functionality. In some embodiments, the reflection functionality of a base class may be provided by a programming language that is compliant with the Microsoft® .NET framework. For example, the C-Sharp (C#) programming language may be utilized.

The reflection functionality allows one to explore at runtime content of the base class and content of classes that derive from the base class. Accordingly, content of the class whose members represent the data elements and their structural organization, may be accessed at runtime, via the base class. The content may then be presented in a form that allows exploring relationships and values of data elements in the data storage.

The format definition in accordance with some embodiments of the invention may be reusable for exploring a structure of content of different data storages. Furthermore, the content may be presented in a form that allows modifying elements representing the content and creating new data that conforms to the modified elements.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
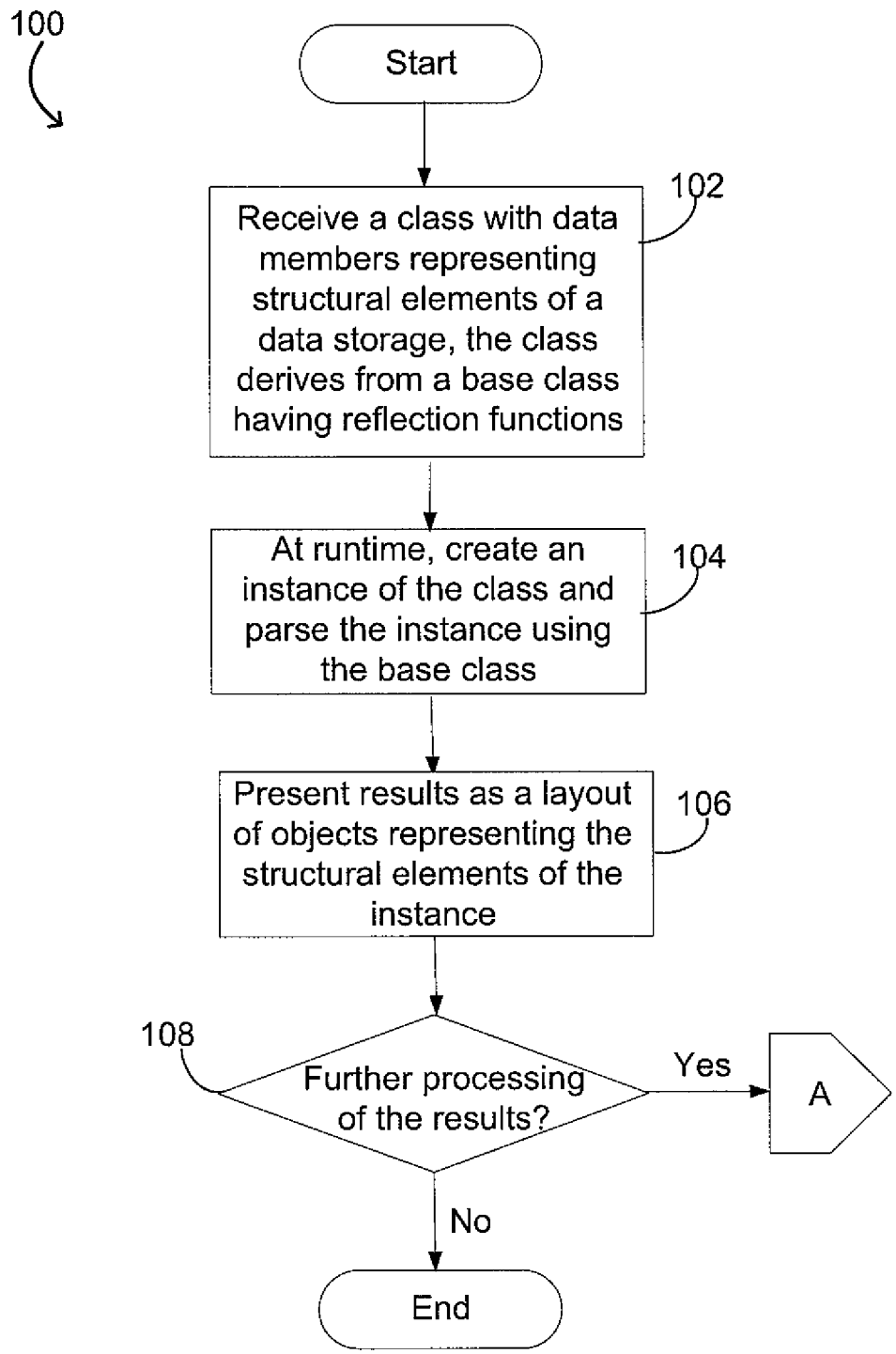
FIG. 1 is a flowchart illustrating a process of representing a structure of a data storage using a format definition, in accordance with some embodiments of the invention.

Applicants have appreciated that experience of users of different applications relating to testing for security vulnerabilities, bug, malware and intrusion detection and many others may be improved if a structure of a data format used to store data used by the applications is defined in a flexible, reusable and extensible way. Such format definition may involve describing the structure of the data format so that the structure can be easily accessed and modified. The structure of the data format refers herein to a structural organization of elements in structured data storages (e.g., computer files, or files) of a certain data format. An example file may be a computer file that comprises predefined portions of storage having data organized into discrete elements. One or more of the discrete elements may include one or more other elements. In some embodiments of the invention, the computer file comprises binary data. The technique for defining the structure of the data format in accordance with some embodiments of the invention may allow parsing any such data storage and displaying results of the parsing in a manner that allows modifying the results, including creating new data that conforms to the modifications.

Further, Applicants have appreciated and recognized that a technique for defining a structure of a data format may involve utilizing a description of the structure of the data format generated using one or more classes written in a suitable programming language. Thus, data elements of a data storage storing data in a certain data format may be represented as data members of the class. The data elements may be any suitable units of data stored in the data storage. For example, a class may represent a data element multiple occurrences of which may be stored in the data storage, with the members of the class representing sub-elements of the data element.

The data members of the class also represent relationships between the data elements of the data storage. For example, if a data storage includes multiple repetitive nonoverlapping elements, or records, each comprising the same number of fields storing different data types, data members of a class may represent the fields of a record and types of data stored in the fields. In some embodiments, the data storage may comprise binary data where each data element is stored as a group of bytes containing related data items. Though, it should be appreciated that embodiments of the invention are not limited to a particular types of the data storage and other types may be substituted.

Applicants have appreciated and recognized that reflection functionality of a programming language, such as a C-Sharp (C#) that is compliant with the Microsoft® .NET framework (".NET framework"), may be utilized to access at runtime the structure of the data format represented using a class. Reflection is a mechanism that allows discovery of information on a class, invoking its data members and retrieving values of the data members, at runtime. In some embodiments of the invention, reflection functions that are part of a reflection namespace provided by the Microsoft® .NET framework are utilized. Though, it should be appreciated that any suitable framework providing reflection functionality may be employed as embodiments of the invention are not limited in this respect.

In some embodiments of the invention, to utilize reflection functions provided by the .NET framework, a class having data members representing a structure of a data format used to store data in any suitable data storage (e.g., a computer file, or file), may derive, or inherit, from one or more base classes providing the reflection functions. The reflection functions allow the base class to inspect its members and members of classes that derive from the base class (i.e., its subclasses) at runtime. In particular, using the reflection functions, the file may be parsed to thus create an instance of the class, were results of the parsing comprise data members of the instance representing the structure of the file. In some embodiments, the file to be parsed may be stored in a binary form. In addition, existing functionality provided by the base classes (e.g., classes in the C# programming language) may be overridden to suit a particular scenario.

Accordingly, because the data members of the instance of the class represent the structure of the file, this structure may be explored by accessing the members of the instance of the class at runtime, through the reflection functions provided by the base classes. In particular, the results of the parsing of the file may be presented on a display device in a form that corresponds to a layout of the structure of the file. In some embodiments, the results of the parsing of the file may be presented in a tree-like form. Hence, each data element of the file may be presented as a node in a tree. Information on the data element may be presented as well. It should be appreciated however that any other suitable representation of the structure of the file may be utilized as embodiments of the invention are not limited in this respect.

The file may comprise different data elements, such as, for example, data items, lists of data items, etc., whose topology and related information may be presented on the display device, in accordance with some embodiments of the invention. The structure of the file may include data elements organized in any suitable manner, including different hierarchical and nested structures. The file may be of any suitable data format nonlimiting examples of which include WMF, AVI, BMP, Excel, JPEG, MP3, OLESS (Object Linking and Embedding Structural Storage), PCT, OneNote, PowerPoint, Tiff and others. The information related to a data element may comprise different attributes, such as a name, value and type of the data element. Moreover, in some embodiments, an offset defining a position from which the data element can be read or written and a size of the data element may be presented as well. Furthermore, content of the file may be presented so that relationships between the data elements are easily appreciated. Accordingly, the techniques described herein may allow presenting the content of the file in a way that closely follows an actual structure of the file and includes values of data in the file.

Furthermore, in some embodiments of the invention, complex organization of data elements in files of a certain data format may be defined in a flexible and reusable manner. In particular, relationships between data elements of a structure of a data format may be represented using inheritance functionality known to be provided by object-oriented programming languages. Thus, a hierarchy of data elements in a file may be presented by a hierarchy of classes, which together inherit from a base class providing the reflection functionality. For example, if a data storage comprises a file in an Excel format comprising more than one data sheets, each data sheet may be represented using a class, and elements within the data sheet (e.g., a collection of records) may be represented as an element of that class (e.g., a list of records). In this example, an abstract class may also be used to represent a record. One or more subclasses of the abstract class that derive from the abstract class may be used to represent different types of the record. As a result, at run time, a layout of items (e.g., objects) representing the data elements and their relationships, along with the information on any suitable attributes of the data elements (e.g., name, value, type, offset, length and any other) may be generated. In some embodiments, the layout of the items may be presented on a display device, in a manner that allows manipulating the items in any suitable fashion.

The techniques described herein allow presenting a structure of a file storing data of a certain data format in an accurate way. In some embodiments of the invention, the structure of the computer file may be presented on any suitable user interface of a display device (e.g., a format browser) in a manner that allows further exploiting the representation of the structure. For example, the user interface may receive user input relating to any suitable modification of the representation of the structure. Accordingly, different applications using data in a manner that is based on knowledge of the structure of the data may employ the techniques according to some embodiments of the invention.

In some embodiments, the above techniques for defining a structure of a data format so that the structure can be accurately presented and explored may be utilized for different testing purposes (e.g., security and functionality testing). Because an accurate and reusable representation of the structure of a file of the data format may be provided, the file may be modified in any suitable manner and the effects of the modification to the structure of the file may be assessed. For example, if a file has been modified (e.g., due to an intrusion to exploit security vulnerabilities) and its structure has therefore been changed, this may be easily detected by parsing the file and examining the results of the parsing, in accordance with some embodiments of the invention.

The techniques in accordance with some embodiments of the invention may be used to modify data in a data storage, such as a file, and explore the effect of the modification on the structure of the file. The file may be modified in any suitable manner. For example, the modification may comprise deleting one or more data elements, adding one or more data elements, changing value of one or more data elements, modifying an order of the data elements and any other suitable modifications. The modifications to the data storage may be performed by any suitable component, such as by a tool for testing for security vulnerabilities, bugs, intrusion attempts or by any other suitable program module. Such tools may then provide the modified file to an application and assess behavior of the application in response to the modification. In some embodiments, the modifications may be performed in an automated manner. However, it should be appreciated that embodiments of the invention are not limited to a particular way of modifying the data storage.

The modification and processing of the results may be used in applications, or tools, that perform what is referred to as fuzzing, which involves modifying a file and exploring changes in a structure of the file due to the modification. The modifications may include malforming one or more portions of the file. An application using any suitable type of fuzzing may utilize a format definition in accordance with some embodiments of the invention. For example, a "smart" fuzzing tool, as known in the art, may utilize the format definition in accordance with some embodiments of the invention.

Furthermore, the format definition in accordance with some embodiments of the invention may be used to generate new data, in a process that is referred to as serialization. The serialization mechanism uses the reflection functionality to determine what data members and in what order are included in a class and obtain values of the data members. The values may then be written in the determined order, in any suitable form, into any suitable component. For example, the values may be stored a sequence of bits, or a byte stream, in a file or memory. Furthermore, the byte stream may be transmitted, via a network connection, to another computing device. Thus, when a structure of a file is presented via a suitable representation, such as a tree comprising nodes each representing an object corresponding to a data element in the file, the representation may be modified and data conforming to the thus modified structure may be created.

A user interface, referred to by way of example as a format browser, in accordance with some embodiments of the invention, allows different modifications to the representation of content of a data storage. For example, the modification may comprise deleting one or more objects, adding one or more objects, changing value(s) associated with one or more objects, modifying an order of the objects and any other suitable modifications. New data may be created from the modified representation, where the structure of the new data conforms to the modifications. The new data may be stored in any suitable form, such as, for example, as binary data or in any other form.

FIG. 1 illustrates a process 100 of representing a structure of a data storage, in accordance with some embodiments of the invention. Process 100 may start at any suitable time. For example, process 100 may start when an application executes that utilizes the data storage, such as a computer file, where a structure of the data storage is analyzed. For example, the application may be a testing tool that uses the computer file for testing purposes, where the computer file is input into a software application being tested. The data storage may be any suitable structured data storage, such as, for example, a binary computer file, where a collection of data elements may be stored so that they do not overlap.

The data members of the class may comprise data items (e.g., an integer, a string, a globally unique identifier, etc.), lists of data items, other classes (i.e., classes that derive from the class), lists of derived classes user and any other data members. Any suitable organization and content of data elements within a data storage may be represented as data members of a class as embodiments of the invention are not limited in this respect.

At block 102, process 100 receives a class with data members of the class representing data elements of a data storage, where the class derives from a base class having reflection functions. Such representation of the data elements of a data storage is referred to as a format definition. The format definition may be received from any suitable source, such as a memory of a computing device or from a network. Data members of the class may represent any suitable data elements of the data storage at any suitable manner. It should be appreciated that the format definition in accordance with some embodiments of the invention may include other classes that may be used for any purpose so that a set of classes in the format definition allows reading content of a data storage, creating an instance of the format definition from the content, and retrieving the content.

Further, to represent complex data elements classes may include data members which are, in turn, other classes that derive from a base class. The hierarchy of classes may begin with a single class which, in turn, derives from a base class providing the reflection functionality. Each format definition may thus include a single "root" class. In embodiments of the invention that deploy the .NET framework, an application may call a suitable method of the root class to initiate parsing of a data storage, in accordance with some embodiments. The application may then use the reflection mechanism to examine the resulting values and structural layout of the data members of one or more classes.

Next, at block 104, at runtime, process 100 creates an instance of the class and parses the instance of the class, using the reflection functionality provided by the base class. In some embodiments, the received class and the base class may be written using a suitable object-oriented programming language, such as a C#. Though, other suitable programming languages may be substituted, as embodiments of the invention are not limited in this respect.

The parsing, as performed at block 104, may involve reading an instance of a data storage, such as, for example, a computer file, and creating objects representing data elements (e.g., a field in a record) of the computer file. The computer file may comprise valid data, where the valid data is defined as data that is expected to be used as an input to an application. In other embodiments, the data in the computer file may be malformed. For example, a suitable fuzzing algorithm may be used to malform one or more portions of the data.

Figure 4:
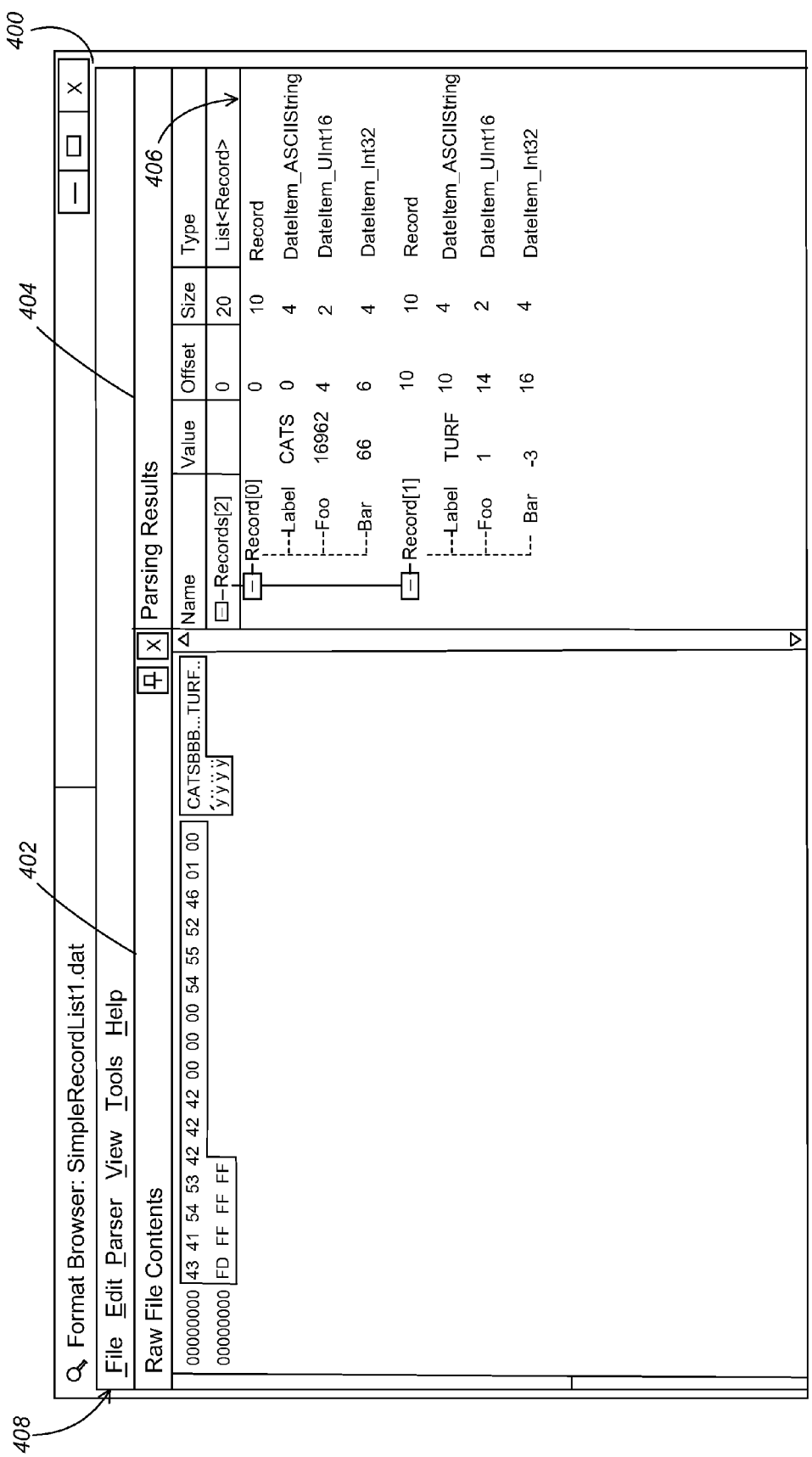
FIG. 4 is a screenshot of a format browser, in accordance with some embodiments of the invention.

Process 100 then continues to block 106, where results of the parsing may be presented, on a display device, as a layout of the objects representing the data elements of the instance of the data storage. Accordingly, each object may be positioned on the display device in a way that reflects a location of a corresponding data element and its relationships with other data elements that are also represented as other objects. The objects representing the data elements may be different items presented in any suitable form. The items may be of any suitable textual, graphical, image, or a combination thereof representation. In some embodiments, a tree-like form for the objects representing the data elements is utilized. Thus, an object tree representation may be created that allows exploring a structure of the data storage, such as a binary file. The objects, or items, are presented in a manner that allows further exploring the properties of the corresponding data elements. For example, along with a topography of the data elements—i.e., their order and relationships (hierarchy), such information as a one or more attributes comprising name, value, type, offset and size of each data element may be presented, as shown in FIG. 4.

Further, process 100 may determine, at decision block 108, whether further processing of the parsing results may be performed. The further processing may comprise further exploring the parsing results (e.g., accessing information on values of data members), modifying, or editing, the parsing results, and any other suitable processing. Different processing may be performed depending on an application that utilizes the format definition.

Figure 2:
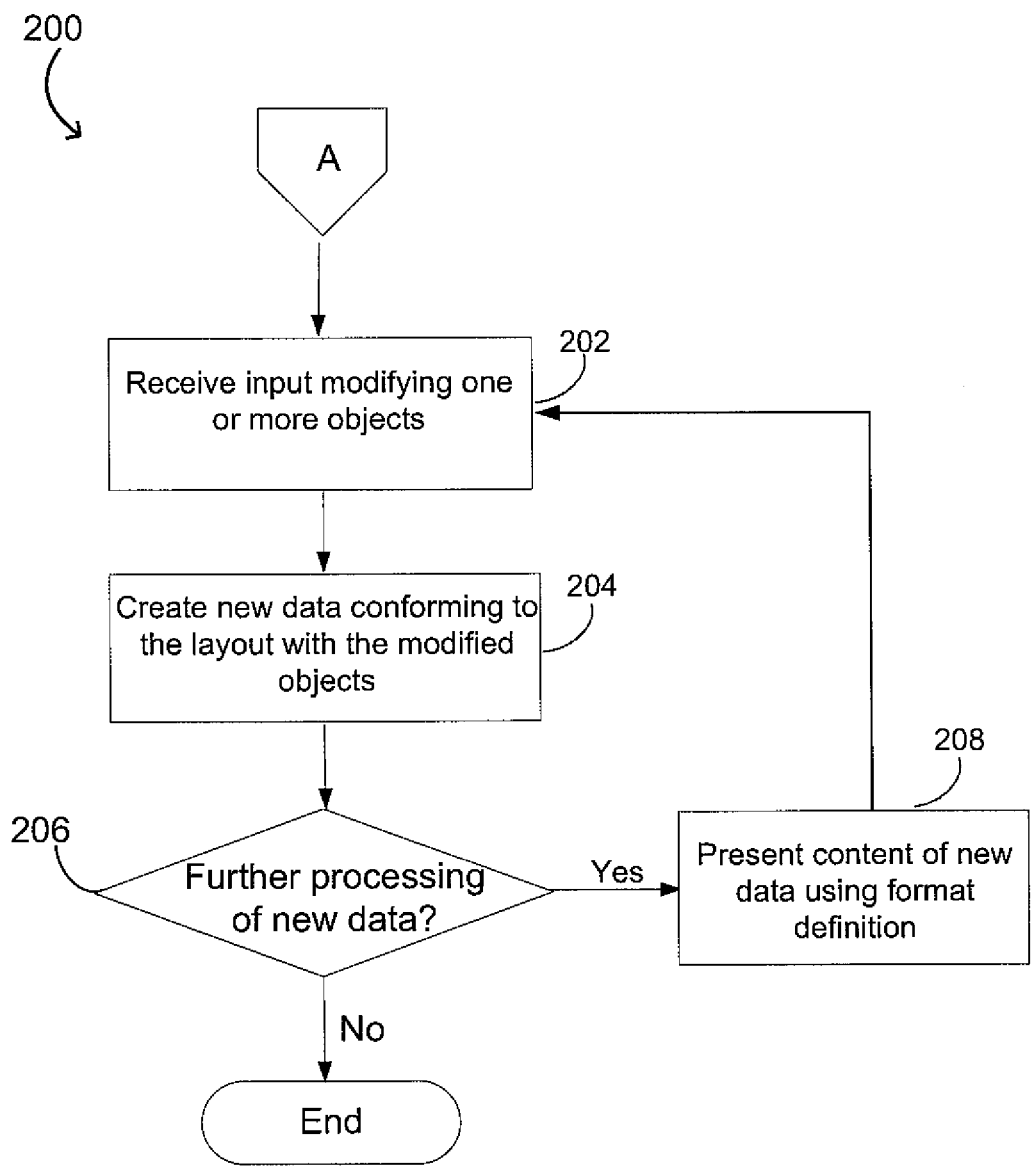
FIG. 2 is a flowchart conceptually illustrating a process of serialization, in accordance with some embodiments of the invention.

If it is determined, at block 108, that the further processing may be performed, process 100 continues to perform processing shown in connection with FIG. 2. Otherwise, process 100 may end.

FIG. 2 illustrates an overview of a process 200 that illustrates using the format definition in accordance with some embodiments of the invention for a serialization process. Process 200 may start at any suitable time. For example, process 200 may start when the results of the parsing are presented on a display device and it has been determined that further processing of the results may be performed, as shown at block 108 in FIG. 1. In other embodiments, process 200 may start regardless of the way in which the results of the parsing are retrieved.

At block 202, process 200 may receive input to modify the parsing results. The input may be user input received via suitable means provided by a user interface, such as a format browser. Alternatively or additionally, in some embodiments, the parsing results may be modified via a component that comprises instructions (e.g., a software code) which, when executed, modify the parsing results in a certain fashion.

In some embodiments, the parsing results may be presented as an object tree representation which allows exploring the structure of the data storage and modifying the presented objects. Any suitable modifications may be performed. For example, the modification may comprise deleting one or more objects, adding one or more objects, changing value(s) associated with one or more objects, modifying an order of the objects and any other suitable modifications.

Next, at block 204, new data (e.g., byte stream) may be created based on the modified representation, where the structure of the new data conforms to the modifications. Accordingly, the new data may be stored in any suitable form, such as, for example, as binary data or in any other form. Hence, a data storage may be generated to store the new data. This process is referred to as a serialization.

At decision block 206, it may be determined whether further processing is required, which may involve presenting the structure of the new data to determine how the modification(s), at block 202, affected the structure. Further modifications to the results of the parsing of the new data may then be made. Thus, process 200 may be iterative in a sense that more than one round of modifications to create new data and analyzing of the new data may be executed. The iterations may be performed automatically. Alternatively, a user such as a software developer may perform the modifications and analysis of thus created data.

Accordingly, if it is determined, at block 206, that further processing is required, process 200 may branch to block 208 where the new data may be analyzed, as shown at blocks 102-106 of FIG. 1. Thus, a structure of the new data may be explored, using a suitable format definition. As a result, the content of the new data may be presented as parsing results, as described above. Next, process 200 may return to block 202 where the parsing results may be again modified. If it is determined, at block 206, that no further processing is required, process 200 may end. It should be appreciated that process 200 may iterate any number of times.

Figure 3:
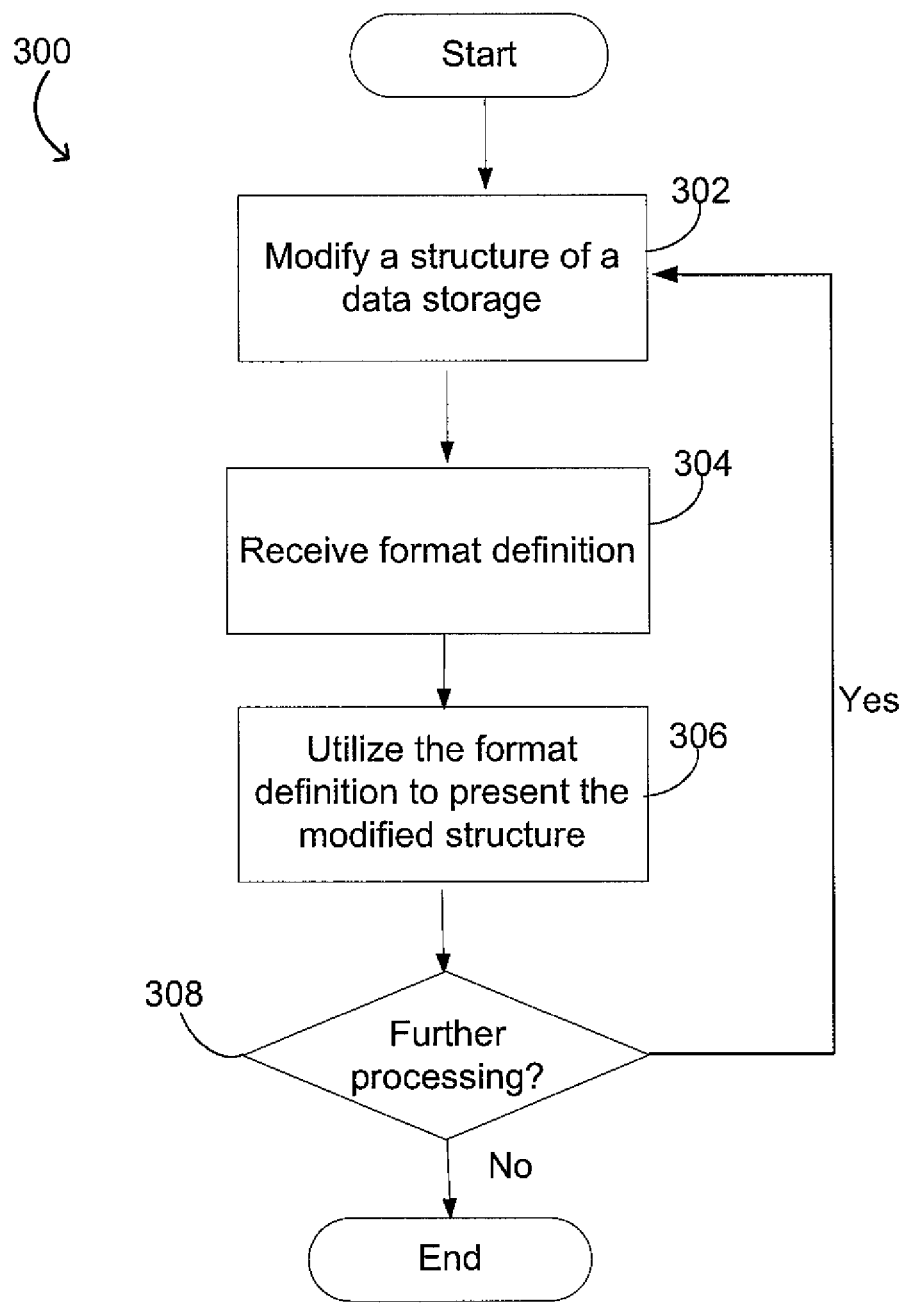
FIG. 3 is a flowchart conceptually illustrating a process of fuzzing, in accordance with some embodiments of the invention.

FIG. 3 illustrates an overview of a process 300 that illustrates using the format definition in accordance with some embodiments of the invention for a fuzzing process. Fuzzing includes modifying data provided to different applications to locate security vulnerabilities and other undesirable features of the applications. Process 300 may start at any suitable time. For example, process 300 may start when an application relating to security testing executes and requires exploring and/or modifying a structure of a data storage comprising one more data elements, which may be organized hierarchically. In some scenarios, the structure of a data storage may have been already explored, as shown at blocks 102-106 of FIG. 1.

At block 302, content of the data storage may be modified, which may be performed in a predetermined, random fashion or any combination thereof. The modification may comprise deleting one or more data elements, adding one or more data elements, changing value of one or more data elements, modifying an order of the data elements and any other suitable modifications. The modifications may be performed by any suitable entity. For example, a program module executed by a processor of a computing device may perform the modifications. Furthermore, any suitable fuzzing algorithm may be used to modify the content of the data storage. At block 304, a format definition for exploring the structure of the data storage may be received from any suitable data source, such as memory or from a network. The format definition may comprise one or more data structures, such as classes derived from one or more base class providing reflection functions, whose data members represent data elements of a type of a data storage. It should be appreciated that processing at blocks 302 and 304 may be performed in any suitable order—i.e. the format definition may be received before the structure of the data storage is modified.

Next, at block 306, the format definition may be utilized to present the modified structure of the data storage, as results of parsing of the data storage. For example, an object tree representation may be utilized. Thus, a user, such as a software developer or a testing engineer, may observe the structure of the data storage and determine effects of the modifications to the structure. Next, at decision block 308, it may be determined whether further processing is required, which may involve making further modifications to the data storage. Process 300 may be executed when a suitable component of a computing device comprising instructions to execute process 300 is executed by one or more processors of the computing device.

Accordingly, if it is determined, at block 308, that further processing is required, process 300 may return to block 302. If it is determined, at block 308, that no further processing is required, process 300 may end.

It should be appreciated that processes 200 and 300 of serialization and fuzzing are shown, in connection with FIGS. 2 and 3, respectively, as separate processes for illustration purposes only. Applications may use both of these processes together, in any suitable combination and order. Fuzzing refers to making modifications to either objects or a data storage, while serialization allows to convert the modified entities into a byte stream. Accordingly, many applications may employ both processes 200 and 300 and any of their variations. It should be noted that both the serialization and fuzzing may be using the reflection functionality.

In some embodiments of the invention, a suitable format definition may be used to parse a data storage (e.g., a binary computer file), create instances, or objects, representing data elements of the data storage and their relationship, retrieve and present the parsing results on a display device. The parsing results may comprise a layout of data elements in the data storage and their associated values.

An example of the techniques in accordance with some embodiments of the invention is presented below. In this example, a data format contains data elements comprising a list of records. Each record comprises three fields such as a 4 byte ASCII string, a 2 byte unsigned value named Foo, and a 4 byte signed value named Bar. A file may contain one or more records which are stored in the file from the beginning of the file to its end. A format definition of such data format may be as follows:

```
            public class Example_SimpleRecordList1 :
                DataFormat
{
    [Order(0)] public List<Record> Records;
    protected override void ParseData(DataInByteArray Data)
    {
        Records = new List<Record>( );
        while (Data.HasDataLeftToRead)
        {
            Records.Add(new Record(Data));
        }
    }
}
            public class Record : DataStructure
{
    [ConstantLength(4)]
    [Order(0)] public DataItem_ASCIIString Label;
    [Order(1)] public DataItem_UInt16 Foo;
    [Order(2)] public DataItem_Int32 Bar;
    public Record(DataInByteArray Data) : base(Data) { }
}
```

In this example, the "root" class is the Example_SimpleRecordList1 class, because it derives from a particular base class, which is, in this example, is named DataFormat. The Example_SimpleRecordList1 class has one data member, a List< > of Records. Each record in the file is represented as a Record class which, in this example, derives from another base class, DataStructure.

The ParseData( )method of the Example_SimpleRecordList1 class is overridden, and a loop may be executed as long as there is data in a file left to be read. In the loop, a new instance of the Record class is initiated by calling its constructor, and the resulting instance added to the Records List< >.

As regards the Record class, it contains three members which are shown by way of example only as instances of classes, such as DataItem types. The classes represented as DataItem classes may provide additional information other than a value of a data member, such as an offset and length of where the value of the data member was stored in the file. The [ConstantLength( )] attribute demonstrates that the length of the data members may be defined to be constant.

In this example, a constructor of the Record class passes data to be parsed to the base class. The constructor of the DataStructure class calls into the ParseData( ) method, which in the case of the Record class is not overridden. The default implementation of the ParseData( ) method uses reflection to determine what fields the subclass contains, and in what order, and handles the automatic parsing of the data based on that information. It should be appreciated that, though, in this example, the constructor of the Record class passes data be parsed to the base class, the data may be parsed to the base class in any suitable manner, as embodiments of the invention are not limited in this respect.

In some embodiments of the invention, classes that represent data that derives from other classes may be used, as long as the inheritance chain derives from a base class (e.g., DataStructure class in C#) providing refection functions. Thus, referring back to the above example describing parsing of the list of records, if the data format would comprise multiple types of records in a list, each requiring a different definition, then an abstract class could be created that derives from the base class, and then each of the classes that describe a particular record type could derive from that abstract class. The List< > member of the DataFormat could then be a List<X> where X is the name of the abstract class.

FIG. 4 illustrates an example of a user interface comprising a format browser 400, in accordance with some embodiments of the invention. The format browser uses a reflection mechanism to examine the parsing results and present them in a tree-like form. Thus, the structure of the instance of the data storage, in accordance with the format definition, as well as values of fields of the data elements may be accessed.

FIG. 4 illustrates by way of example only results of examining content of a data storage using the exemplary Example_SimpleRecordList1 and Record classes discussed above. It should be appreciated that any suitable classes may be used in a format definition in accordance with some embodiments of the invention. Moreover, the classes may derive from any suitable base classes providing reflection functions.

As shown in FIG. 4, a binary file, referred to as "Raw File Contents" in a left panel 402 is presented as the parsing results 406, in a right panel 404. The panel 400 displays results 406 of parsing of the file shown as "Raw File Contents." The parsing results comprise topography of the data elements stored in the file, which is, in this example, an order of the two records each comprising three fields, and additional information on each data element such as its name, value, offset, size and type. Any other suitable information of the content and structure of the data elements of the file may be presented as well. Furthermore, it should be appreciated that the information on content of the file is presented in FIG. 4 by way of example only as embodiments of the invention are not limited in this respect.

The format browser 400 or any other suitable user interface may present results of the parsing of the file in any suitable way. Furthermore, format browser 400 may accept user input relating to hiding certain information or presenting further information. For example, only the structural organization of the file (e.g., in this example, names of the records and the field of the records) may be presented. Format browser 400 may then accept user input relating to selecting suitable entities in the presentation to present further information on each of the data elements. Format browser 400 may comprise any suitable menu commands referred to collectively as elements 408, which allow performing different operations on the data presented in format browser 400, as well as presenting the data in different ways. It should be appreciated format browser 400 may comprise any suitable menus and control as embodiments of the invention are not limited in this respect.

Furthermore, format browser 400 may accept user input instructing modifications to be made to parsing results 406. Format browser 400 may be used for a serialization process, where objects presented as parsing results 406 may be converted into a sequence of bits which are then stored in suitable manner. If modifications are made to parsing results, new data may be created from the modified parsed results 406, via the serialization process.

Figure 5:
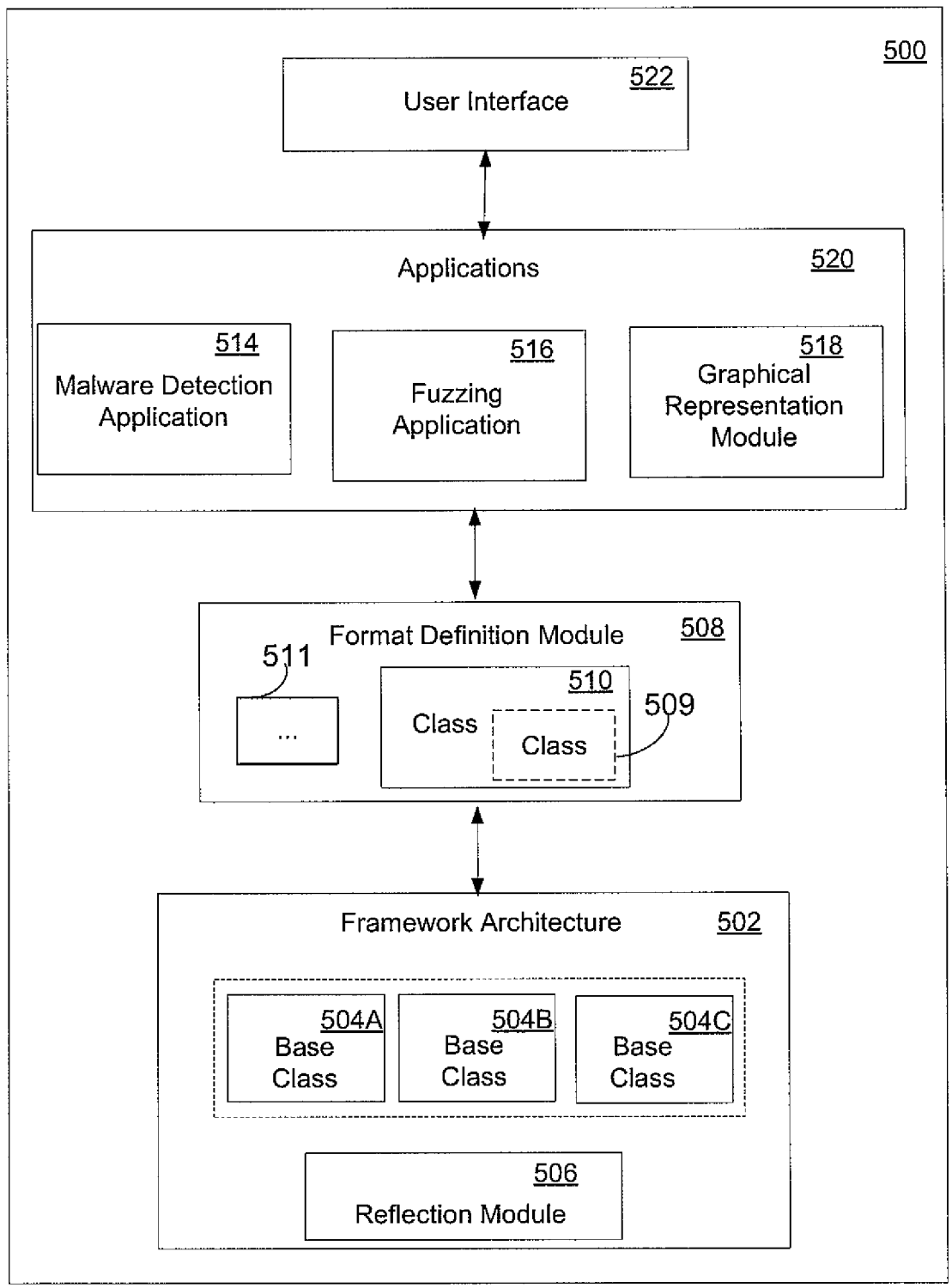
FIG. 5 in a block diagram of exemplary components of a system in which some embodiments of the invention may be implemented.

FIG. 5 illustrates an exemplary system 500 in which some embodiments of the invention may be implemented. System 500 comprises framework architecture module 502, format definition module 508 that utilizes components of framework architecture 502, and different applications 520 that employ format definitions stored in format definition module 508. The components of system 500 may be stored in any suitable computing device.

In this example, framework architecture module 502 comprises different base classes 504 which are shown by way of example only as base classes 504A, 504B and 504C, to emphasize that any suitable base classes may be utilized. The base classes 504 may be known classes that provide a reflection functionality. Each of the base classes may be extended for the particular additional capability required by a particular format definition (e.g., depending on an application using the format definition).

Each of the base classes may derive from another class, which is not shown in this example. In some embodiments, the base classes may be any suitable C# classes. Framework architecture module 502 is shown to include reflection module 506 that provides the reflection functionality. It should be appreciated that reflection module 506 is shown as a separate component from base classes 504 by way of example only.

Format definition module 508 may comprise a format definition that comprises one or more classes. Thus, the format definition may comprise class 510 which is a class that derives from any of classes 504A, 504B, 504C, or any other suitable base classes that have the reflection functionality, which allows parsing of instances of a data storage defined in the format definition. Class 510 may be used to represent a structure of a data format, and the reflection functions may be accessed by class 510 via the base classes. When an instance of class 510 passes data to its base class, the parsing functionality of the base class is employed. For example, the instance may pass the data to the base class via a constructor of class 510. Though, the instance may pass the data to the base class in any suitable way as embodiments of the invention are not limited in this respect. For example, any suitable function member of class 510 may be used to pass the data to the base class.

Format definition module 508 may comprise other classes, collectively shown by way of example as a block 511, which may also derive from one or more base classes. For example, one or more classes 511 may be implemented to read data elements from a data storage and, for each of the data element, instantiate an instance of class 510. In such embodiments, each data element may comprise other data elements, or subelements, which are represented as data members of class 510.

Accordingly, data members of class 510 may represent data elements of a data storage, with class 510 representing a data element encompassing the data elements. For example, class 510 may represent a record, while data members of class 510 may represent fields within the record. Another class (e.g., one of classes 511) may be used to read a data storage comprising a set of records to thus create instances of class 510, each representing a record from the set of records.

In the above example, the set of records may comprise records having the same number of fields, with each field storing a certain type of data. However, embodiments of the invention are not limited to a type and a number of data elements in a data storage. Thus, if a data storage comprises records of different types, an abstract class may be implemented, and a number of classes, such as class 510, may be implemented, each representing a record of a certain type. The classes may derive from the abstract class. A class that is used to read the data storage comprising the records of different types may then use the abstract class to create instances of classes representing the records of different types.

In some embodiments, to represent hierarchal relationships of the data elements of the data storage, inheritance mechanism may be used. Thus, class 510 may have one or more derived classes 509 that derive from class 510. Class 509 is shown in a dashed line to indicate that class 510 may or may not have derived class 509, depending on a type of data storages content of which is described via a format definition.

Applications 520 may employ format definitions stored in format definition module 508. Examples of applications 520 may comprise malware detection application 514, fuzzing application 516, and graphical representation module 518. Malware detection application 514 may utilize format definitions provided by format definition module 508 for different security vulnerability testing and detection purposes. For example, malware detection application 514 may utilize format definitions determine whether a data storage has been corrupted in a way intended to exploit a particular security vulnerability. These would affect a structure of the data storage, as presented via a format definition. Further, content of a data storage may be intentionally changed for testing purposes, to determine how certain changes affect the structure of the data storage. Fuzzing application 516 may utilize format definitions stored in format definition module 508 in a similar manner Graphical representation module 518 may be an application providing a format browser, as shown in FIG. 4.

Further, system 500 may comprise user interface 522 to present results of exploring a structure of a data storage using a format definition according to some embodiments of the invention. Format browser provided by graphical representation module 518 may be presented via user interface 522. In addition, other applications may employ the format browser provided by graphical representation module 518 to retrieve and explore a structure of a data storage. In some embodiments, the applications may receive input (e.g., user input) to modify results of the representation of the structure.

It should be appreciated that, though applications 520 are shown as part of system 500, applications 520 may be executed in any suitable location and may not be located within the same computing device as framework architecture 502 and format definition module 508. Further, framework architecture 502 and format definition module 508 may be stored in different locations, such as different computing devices which may communicate via a network. In some embodiments of the invention, the components shown in connection with FIG. 5 may be implemented in a computing device that employs the .NET Framework. Further, in embodiments of the invention, the components shown in connection with FIG. 5 may be stored as computer-executable instructions, which, when executed by one or more processors, may perform exploring a structure of a data storage, using a format definition in accordance with some embodiment of the invention. Further, the components may be implemented in software, hardware, or any suitable combination thereof, as embodiments of the invention are not limited in this respect.

As used in this application, the terms "component", "system", are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Furthermore, all or portions of embodiments of the invention can be implemented as a system, method, apparatus, or article of manufacture using standard programming and/or engineering techniques to produce software, firmware, hardware or any combination thereof to control a computer to implement embodiments of the invention. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 6:
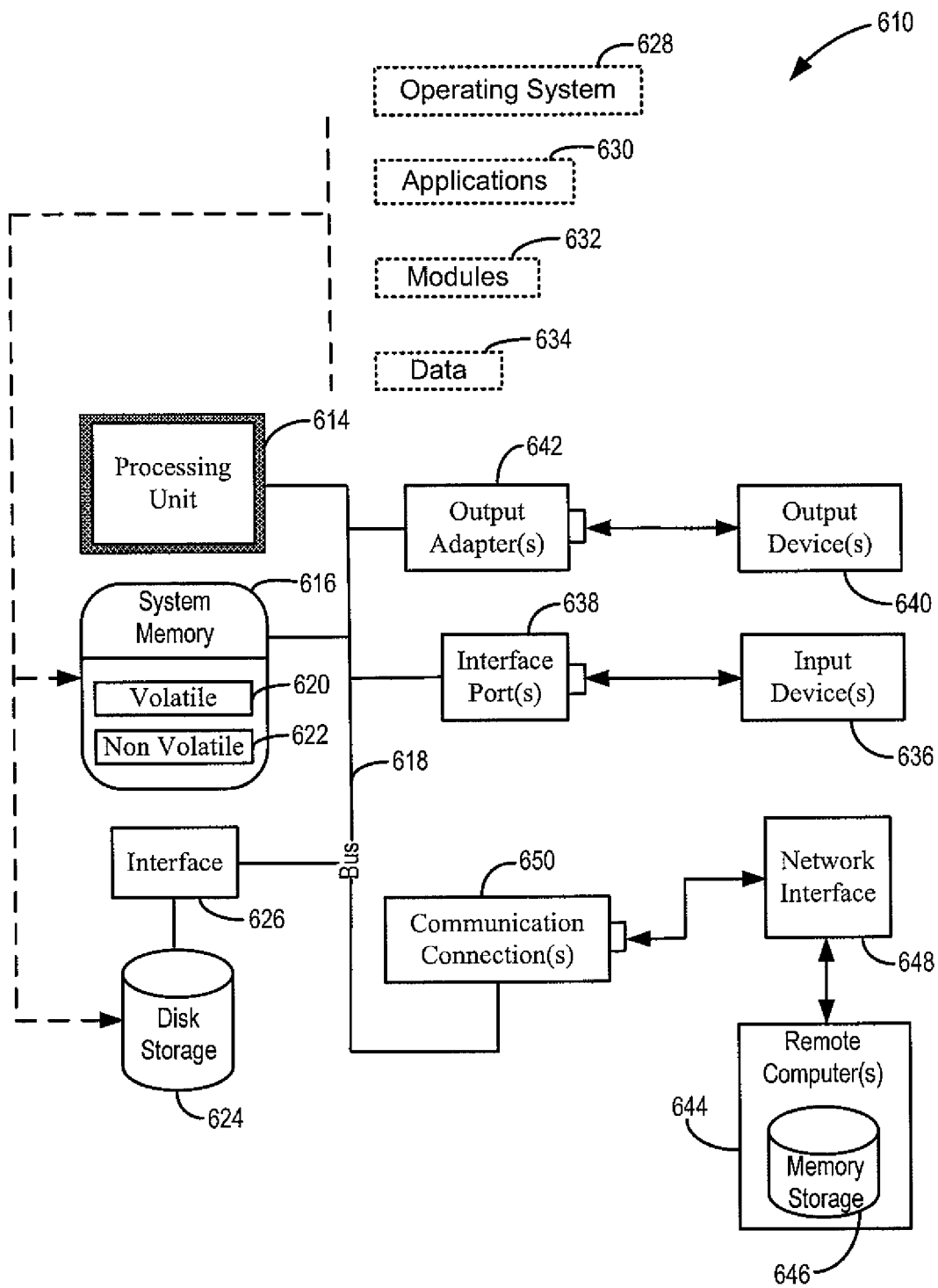
FIG. 6 is schematic diagram that illustrates an exemplary environment in which some embodiments of the invention may be implemented.

In order to provide a context for the various aspects of the disclosed subject matter, FIG. 6 as well as the following discussion is intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that embodiments of the invention also may be implemented in combination with other program modules. Generally, program modules include routines, programs, components, data structures, and the like, which perform particular tasks and/or implement particular abstract data types. Moreover, those skilled in the art will appreciate that the innovative methods can be practiced with other computer system configurations, including single-processor or multiprocessor computer systems, mini-computing devices, mainframe computers, as well as personal computers, handheld computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some embodiments of the invention can be practiced on stand-alone computers. In a distributed computing environment, program modules may be located in both local and remote memory storage devices.

With reference to FIG. 6, an exemplary environment 610 for implementing various aspects of embodiments of the invention is described that includes a computer 612. The computer 612 includes a processing unit 614, a system memory 616, and a system bus 618. The system bus 618 couples system components including, but not limited to, the system memory 616 to the processing unit 614. The processing unit 614 can be any of various available processors. Dual microprocessors and other multiprocessor architectures also can be employed as the processing unit 614.

The system bus 618 can be any of several types of bus structure(s) including the memory bus or memory controller, a peripheral bus or external bus, and/or a local bus using any variety of available bus architectures including, but not limited to, II-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 616 includes volatile memory 620 and nonvolatile memory 622. The basic input/output system (BIOS), containing the basic routines to transfer information between elements within the computer 612, such as during start-up, is stored in nonvolatile memory 622. For example, nonvolatile memory 622 can include read only memory (ROM), programmable ROM (PROM), electrically programmable ROM (EPROM), electrically erasable ROM (EEPROM), or flash memory. Volatile memory 620 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 612 also includes removable/non-removable, volatile/non-volatile computer storage media. FIG. 6 illustrates a disk storage 624, wherein such disk storage 624 includes, but is not limited to, devices like a magnetic disk drive, floppy disk drive, tape drive, Jaz drive, Zip drive, LS-60 drive, flash memory card, or memory stick. In addition, disk storage 624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 624 to the system bus 618, a removable or non-removable interface is typically used such as interface 626.

It is to be appreciated that FIG. 6 describes software that acts as an intermediary between users and the basic computer resources described in suitable operating environment 610. Such software includes an operating system 628. Operating system 628, which can be stored on disk storage 624, acts to control and allocate resources of the computer system 612. System applications 630 take advantage of the management of resources by operating system 628 through program modules 632 and program data 634 stored either in system memory 616 or on disk storage 624. It is to be appreciated that various components described herein can be implemented with various operating systems or combinations of operating systems.

A user enters commands or information into the computer 612 through input device(s) 636. Input devices 636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 614 through the system bus 618 via interface port(s) 638. Interface port(s) 638 include, for example, a serial port, a parallel port, a game port, and a universal serial bus (USB). Output device(s) 640 use some of the same type of ports as input device(s) 636. Thus, for example, a USB port may be used to provide input to computer 612, and to output information from computer 612 to an output device 640. Output adapter 642 is provided to illustrate that there are some output devices 640 like monitors, speakers, and printers, among other output devices 640 that require special adapters. The output adapters 642 include, by way of illustration and not limitation, video and sound cards that provide a means of connection between the output device 640 and the system bus 618. It should be noted that other devices and/or systems of devices provide both input and output capabilities such as remote computer(s) 644.

Computer 612 can operate in a networked environment using logical connections to one or more remote computers, such as remote computer(s) 644. The remote computer(s) 644 can be a personal computer, a server, a router, a network PC, a workstation, a microprocessor based appliance, a peer device or other common network node and the like, and typically includes many or all of the elements described relative to computer 612. For purposes of brevity, only a memory storage device 646 is illustrated with remote computer(s) 644. Remote computer(s) 644 is logically connected to computer 612 through a network interface 648 and then physically connected via communication connection 660. Network interface 648 encompasses communication networks such as local-area networks (LAN) and wide area networks (WAN). LAN technologies include Fiber Distributed Data Interface (FDDI), Copper Distributed Data Interface (CDDI), Ethernet/IEEE 802.3, Token Ring/IEEE 802.6 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 660 refers to the hardware/software employed to connect the network interface 648 to the bus 618. While communication connection 650 is shown for illustrative clarity inside computer 612, it can also be external to computer 612. The hardware/software necessary for connection to the network interface 648 includes, for exemplary purposes only, internal and external technologies such as, modems including regular telephone grade modems, cable modems and DSL modems, ISDN adapters, and Ethernet cards.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above. As used herein, the term "non-transitory computer-readable storage medium" encompasses only a computer-readable medium that can be considered to be a manufacture (i.e., article of manufacture) or a machine.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operating a computing device comprising at least one processor and memory, the method comprising:
    with the at least one processor:
        receiving, from a data source, a data structure comprising at least one function member and at least one data member representing at least one data element of a data storage, wherein the data structure is derived from a base data structure that allows accessing values of instances of the at least one data member;
        creating an instance of the data structure comprising an instance of the at least one data member;
        parsing, via the base data structure, the instance of the data structure to provide a representation of the instance of the at least one data member, wherein the representation comprises a layout of at least one item representing the at least one data element of the data storage;
        presenting the layout representing one or more results of the parsing on a display device;
        receiving an input to modify one or more of the presented results;
        creating new data conforming to the layout with the one or more modified results;
        analyzing the new data to determine whether further processing is required; and
        iteratively creating and analyzing the new data until a determination is made that no further processing is required.

2. The method of claim 1, wherein the at least one data member comprises at least one other data structure that derives from the base data structure.

3. The method of claim 1, wherein the data storage comprises a binary computer file.

4. The method of claim 3, further comprising displaying the layout with the one or more modified results on the display device.

5. The method of claim 1, wherein the data source comprises at least one of the memory of the computing device and a network.

6. The method of claim 1, wherein iteratively creating and analyzing the new data comprises automatically performing iterations of creating and analyzing the new data until a determination is made that no further processing is required.

7. The method of claim 1, wherein creating the instance of the data structure comprises reading the at least one data element data from a structured data storage.

8. The method of claim 1, wherein the data structure comprises a class written in an object-oriented programming language and wherein the base data structure comprises a base class written in the object-oriented programming language.

9. A method of operating a computing device comprising at least one processor and memory, the method comprising:
    with the at least one processor:
        receiving, from a data source, at least one class comprising at least one data member representing at least one data element of a data storage, wherein the at least one class is derived from at least one base class that allows accessing values of instances of the at least one data member at runtime;
        creating an instance of the at least one class comprising an instance of the at least one data member;
        parsing, via the at least one base class, the instance of the at least one class to provide a representation of the instance of the at least one data member, wherein the representation comprises a layout of at least one item representing the at least one data element of the data storage;
        presenting the layout representing one or more results from the parsing to a user;
        receiving an input from the user to modify one or more of the presented results;
        analyzing new data generated from the one or more modified results to determine whether further processing is required; and
        exploring a structure of the new data using a format definition if further processing is required.

10. The method of claim 9, wherein the at least one base class allows accessing values of instances of the at least one data member via at least one reflection function.

11. The method of claim 9, wherein the at least one class is written in an object-oriented programming language.

12. The method of claim 11, wherein creating the instance of the at least one class comprises reading data from the data storage, the method further comprising:
    reading the data storage comprising the one or more modified elements;
    creating a second instance of the at least one class which comprises a second instance that represents the one or more modified elements; and
    parsing, via the at least one base class, the second instance of the at least one class to provide a representation which comprises a layout of at least one second item representing the one or more modified elements of the data storage.

13. The method of claim 9, wherein the at least one item representing the at least one data element of the data storage comprises at least one attribute of the at least one data element.

14. The method of claim 9, wherein the at least one attribute comprises at least one of a name, a value, a type, a offset and a length.

15. The method of claim 9, wherein the at least one data member comprises at least one other class that derives from the class.

16. A device comprising:

a processor; and executable instructions operable by the processor, the executable instructions comprising a method of representing and exploring content of a data storage, the method comprising:

receiving, from a data source, at least one class comprising at least one data member representing at least one data element of the data storage, wherein the at least one class is derived from at least one base class that allows accessing values of instances of the at least one data member;

creating an instance of the class comprising an instance of the at least one data member;

parsing, via the base class, the instance of the class to provide a representation of the instance of the at least one data member, wherein the representation comprises information on a layout of the at least one data element of the data storage and at least one attribute of the at least one data element;

presenting the layout representing one or more results from the parsing to a user;

receiving an input from the user to modify one or more of the presented results;

creating new data conforming to the layout with the one or more modified results;

analyzing the new data to determine whether further processing is required; and exploring a structure of the new data using a format definition if further processing is required.

17. The device of claim 16, wherein the at least one data member comprises at least one other class that derives from the at least one base class.

18. The device of claim 16, wherein the at least one class derives from an abstract class.

19. The device of claim 16, wherein the data storage comprises a binary file.

20. The device of claim 16, wherein the method further comprises presenting the layout with the one or more modified results to the user.

* * * * *